United States Patent
Buczek et al.

(10) Patent No.: US 8,462,679 B2
(45) Date of Patent: Jun. 11, 2013

(54) METHODS AND APPARATUS FOR PRODUCING AND SUBMITTING AN HTTP REQUEST WITH A SELECTED TOP-LEVEL DOMAIN FROM A MOBILE COMMUNICATION DEVICE

(75) Inventors: Tomasz Buczek, Mississauga (CA); Kalu Onuka Kalu, Waterloo (CA); Sanjay Kalyanasundaram, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 664 days.

(21) Appl. No.: 12/395,218

(22) Filed: Feb. 27, 2009

(65) Prior Publication Data

US 2009/0286521 A1 Nov. 19, 2009

Related U.S. Application Data (60) Provisional application No. 61/127,833, filed on May 14, 2008.

(51) Int. Cl.
*H04B 7/00* (2006.01)

(52) U.S. Cl.
USPC .......................................................... 370/310

(58) Field of Classification Search
USPC ................. 370/310, 328, 351; 455/414, 415, 455/422, 432, 435
See application file for complete search history.

(56) References Cited

U.S. PATENT DOCUMENTS

| | | | |
|---|---|---|---|
| 6,256,498 B1 * | 7/2001 | Ludwig | 455/433 |
| 6,731,612 B1 | 5/2004 | Koss | |
| 6,839,742 B1 * | 1/2005 | Dyer et al. | 709/217 |

(Continued)

FOREIGN PATENT DOCUMENTS

| | | |
|---|---|---|
| EP | 1783970 A2 | 5/2007 |
| EP | 1788750 A1 | 5/2007 |

(Continued)

OTHER PUBLICATIONS

J. Postel, "Domain Name System Structure and Delegation", RFC 1591, Network Working Group, <http://tools.ietf.org/html/rfc1591>, 8 pages, Mar. 1994.

(Continued)

*Primary Examiner* — Dmitry H Levitan
(74) *Attorney, Agent, or Firm* — John J. Oskorep, Esq.

(57) ABSTRACT

A mobile communication device is associated with a home wireless carrier that is identifiable by a home carrier identification stored in its memory. The mobile device also maintains a stored list of a plurality of carrier identifications, where each carrier identification is stored in association with one of a plurality of top-level domains. The mobile device reads the home carrier identification from the memory, and selects one of the plurality of top-level domains that is stored in association with the home carrier identification. During operation, the mobile device reads a specified domain name in response to a user-initiated request made via a Web browser or search application. Then, the mobile device produces a Hypertext Transfer Protocol (HTTP) request with a Uniform Resource Locator (URL) having the selected top-level domain and a second-level domain corresponding to the specified domain name. The HTTP request with the URL is submitted via the wireless communication network. Advantageously, consistency in accessing web sites, information, and/or search results may be achieved regardless of location of the mobile station.

29 Claims, 8 Drawing Sheets

U.S. PATENT DOCUMENTS

| | | | |
|---|---|---|---|
| 7,099,675 B2 * | 8/2006 | Keutmann et al. | 455/456.1 |
| 7,215,947 B2 | 5/2007 | Dowling et al. | |
| 7,274,933 B2 * | 9/2007 | Zinn et al. | 455/435.2 |
| 7,386,311 B2 * | 6/2008 | Soga et al. | 455/432.1 |
| 7,788,321 B2 * | 8/2010 | Korovkin et al. | 709/203 |
| 2001/0001875 A1 * | 5/2001 | Hirsch | 713/1 |
| 2001/0028469 A1 | 10/2001 | Ooi et al. | |
| 2002/0073233 A1 | 6/2002 | Gross et al. | |
| 2005/0076097 A1 * | 4/2005 | Sullivan et al. | 709/218 |
| 2006/0135155 A1 | 6/2006 | Chung et al. | |
| 2006/0174127 A1 | 8/2006 | Kalavade et al. | |
| 2007/0167174 A1 | 7/2007 | Halcrow et al. | |
| 2007/0226608 A1 | 9/2007 | Virk et al. | |
| 2007/0240202 A1 | 10/2007 | Sullivan et al. | |
| 2008/0259882 A1 * | 10/2008 | Abdel-Kader et al. | 370/338 |
| 2009/0011697 A1 * | 1/2009 | Tobita et al. | 455/3.01 |
| 2009/0011758 A1 * | 1/2009 | Aoki et al. | 455/432.1 |

FOREIGN PATENT DOCUMENTS

| | | |
|---|---|---|
| JP | 2004038227 | 2/2004 |
| TW | 254550 B | 5/2006 |
| WO | 0062484 A1 | 10/2000 |
| WO | 0122296 A1 | 3/2001 |

OTHER PUBLICATIONS

Extended European Search Report, EPO Application No. 09154551.7, Jul. 16, 2009. 4 pages.

U.S. Appl. No. 12/395,297, filed Feb. 27, 2009, Inventors Buczek et al., 39 pages.

Greaves et al., Adding support for an unsupported language to an IBM WebSphere Portal implementation, www.ibm.com/developerworks/websphere/library/techarticles/0809 greaves/, Sep. 23, 2008, 7 pages.

John Yunker, The Localization of iPhone, Global by Design, http://www.globalbydesign.com/blog/2007/08/29/the-localization-of-iphone, Aug. 29, 2007, 1 page.

GSM Association, Official Document IR.61, WLAN Roaming Guidelines (also known as Inter-Operator Handbook), Version 3.1.0, Aug. 2004, 45 pages.

* cited by examiner

Web Images Maps News Shopping Gmail more ▼    Sign

|  what is brusque definition  | Search |  Advanced Search
Preferences

Web    Results 1 - 10 of about 77,300 for what is brusque definition. (0.34 seconds)

brusque: Definition, Synonyms and Much More from Answers.com
brusque also brusk adj; Abrupt and curt in manner or speech; discourteously blunt. See synonyms at gruff.
www.answers.com/topic/brusque - 52k - Cached - Similar pages brusque - definition of brusque by the Free Online Dictionary ...
Definition of brusque in the Online Dictionary. Meaning of brusque. Pronunciation of brusque. Translations of brusque. brusque synonyms, brusque antonyms.
www.thefreedictionary.com/brusque - 32k - Cached - Similar pages brusque - definition of brusque from YourDictionary.com
brusque definition, words related to brusque, proper usage and pronunciation of the word brusque from YourDictionary.com.
www.yourdictionary.com/brusque - 14k - Cached - Similar pages brusque - Definition from the Merriam-Webster Online Dictionary
Definition of brusque from the Merriam-Webster Online Dictionary with audio pronunciations, thesaurus, Word of the Day, and word games.
www.merriam-webster.com/dictionary/brusque - 28k - Cached - Similar pages

METHODS AND APPARATUS FOR PRODUCING AND SUBMITTING AN HTTP REQUEST WITH A SELECTED TOP-LEVEL DOMAIN FROM A MOBILE COMMUNICATION DEVICE

CROSS-REFERENCE TO RELATED APPLICATION

The present application claims priority to and is a non-provisional patent application of U.S. provisional patent application having application No. 61/127,833 and filing date of 14 May 2008, which is hereby incorporated by reference herein.

BACKGROUND

1. Field of the Technology

The present disclosure relates generally to mobile communication devices operative in wireless communication networks, and more particularly to a mobile communication device which operates with use of a data application such as a Web browser or Internet search application.

2. Description of the Related Art

A mobile communication device may operate in a wireless communication network which provides for high-speed packet data communications. The mobile device may offer a number of different capabilities or features for a user. Many of these capabilities are defined by the different applications which are installed in the mobile device. The mobile device may have a voice telephony application, a data or message synchronization application (e.g. for e-mail messages or calendar items), a Web browser or Internet search application, as examples, or combinations thereof.

With use of the Web browser or search application, the mobile device operating in the wireless network may interface with a server of another communication network (e.g. the Internet) to access information. A user of the mobile device may enter in a domain name of a URL in the Web browser application in a request to access a web page of the server. If the server is or has a search engine, the user may also submit search (e.g. text) parameters via a Web page in a request to initiate a search for information via the search engine based on the search parameters. Depending on the (world-wide) location of the mobile device, however, an unexpected web site, search results, and/or information may be received in response to such request.

What are needed are methods and apparatus to overcome these and related deficiencies of the prior art. The same or similar problems may exist in other networks and devices.

BRIEF DESCRIPTION OF THE DRAWINGS

Embodiments of present disclosure will now be described by way of example with reference to attached figures, wherein.

DETAILED DESCRIPTION OF THE PREFERRED EMBODIMENTS

According to the present disclosure, a mobile communication device is associated with a home wireless carrier that is identifiable by a home carrier identification stored in its memory. The mobile device also maintains a stored list of a plurality of carrier identifications, where each carrier identification is stored in association with one of a plurality of top-level domains. The mobile device reads the home carrier identification from the memory, and selects one of the plurality of top-level domains that is stored in association with the home carrier identification. During operation, the mobile device reads a specified domain name in response to a user-initiated request made via a Web browser or search application. Then, the mobile device produces a Hypertext Transfer Protocol (HTTP) request with a Uniform Resource Locator (URL) having the selected top-level domain and a second-level domain corresponding to the specified domain name. The HTTP request with the URL is submitted via the wireless communication network. Advantageously, consistency in accessing web sites, information, and/or search results may be achieved regardless of location of the mobile station.

Figure 1:
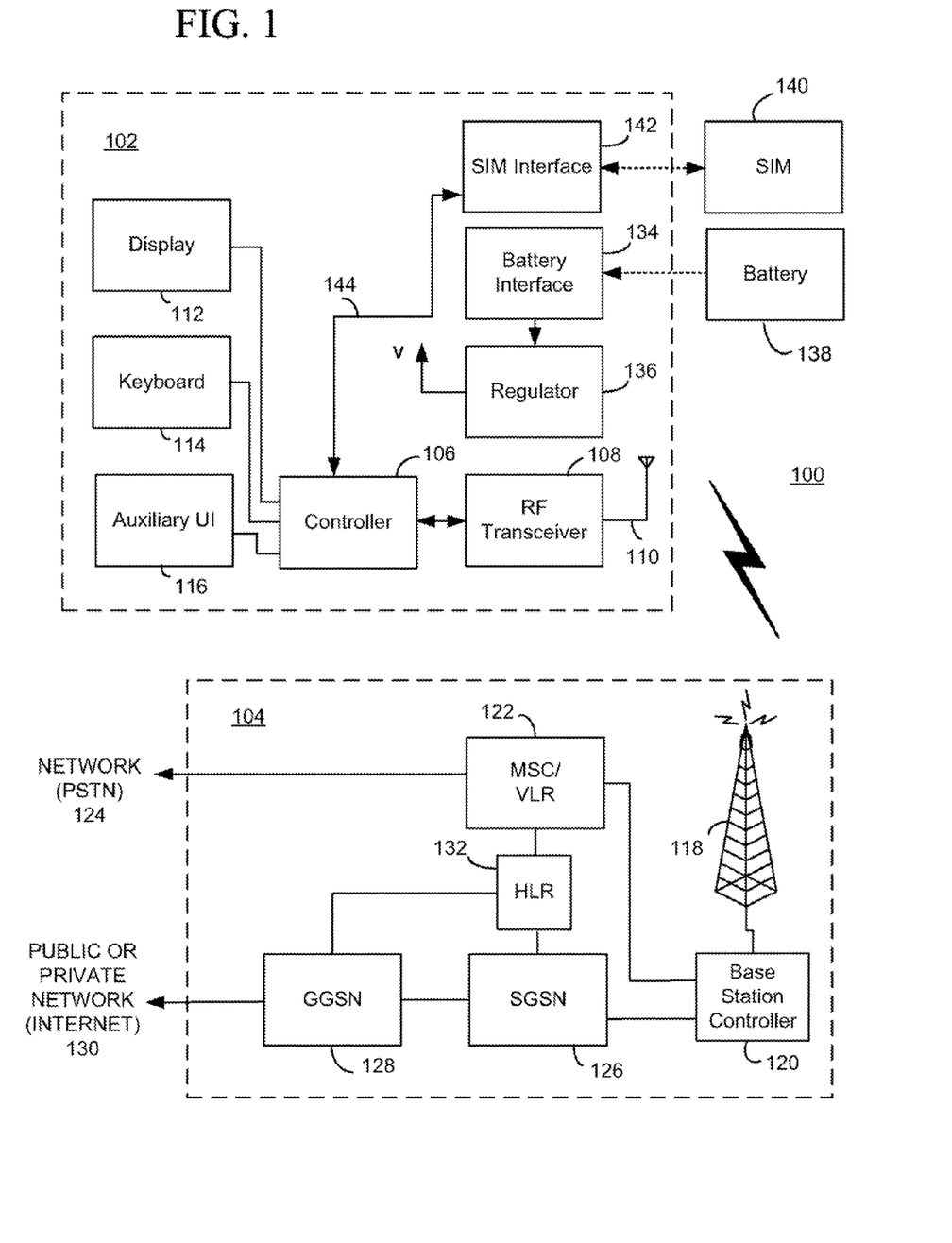
FIG. 1 is a block diagram which illustrates pertinent components of a mobile communication device and a wireless communication network within which the mobile communication device may operate.

To illustrate exemplary system archtecture, FIG. 1 shows a block diagram of a communication system 100 which includes a mobile station 102 (one example of a wireless or mobile communication device) which communicates through a wireless communication network 104. Mobile station 102 preferably includes a visual display 112, a keyboard 114, and perhaps one or more auxiliary user interfaces (UI) 116, each of which are coupled to a controller 106. Controller 106 is also coupled to radio frequency (RF) transceiver circuitry 108 and an antenna 110. Typically, controller 106 is embodied as a central processing unit (CPU) which runs operating system software in a memory component (not shown). Controller 106 will normally control overall operation of mobile station 102, whereas signal processing operations associated with communication functions are typically performed in RF transceiver circuitry 108. Controller 106 interfaces with device display 112 to display received information, stored information, user inputs, and the like. Keyboard 114, which may be a telephone type keypad or full alphanumeric keyboard, is normally provided for entering data for storage in mobile station 102, information for transmission to network 104, a telephone number to place a telephone call, commands to be executed on mobile station 102, and possibly other or different user inputs.

Mobile station 102 sends communication signals to and receives communication signals from network 104 over a wireless link via antenna 110. RF transceiver circuitry 108 performs functions similar to those of a tower station 118 and a base station controller (BSC) 120 (described later below), including for example modulation/demodulation and possibly encoding/decoding and encryption/decryption. It is also contemplated that RF transceiver circuitry 108 may perform certain functions in addition to those performed by BSC 120. It will be apparent to those skilled in art that RF transceiver circuitry 108 will be adapted to particular wireless network or networks in which mobile station 102 is intended to operate. When mobile station 102 is fully operational, an RF transmitter of RF transceiver circuitry 108 is typically keyed or turned on only when it is sending to network, and is otherwise turned off to conserve resources. Similarly, an RF receiver of RF transceiver circuitry 108 is typically periodically turned off to conserve power until it is needed to receive signals or information (if at all) during designated time periods.

Mobile station 102 includes a battery interface 134 for receiving one or more rechargeable batteries 138. Battery 138 electrical power to electrical circuitry in mobile station 102, and battery interface 134 provides for a mechanical and electrical connection for battery 132. Battery interface 134 is coupled to a regulator 136 which regulates power to the device. Mobile station 102 may be a handheld portable communication device, which includes a housing (e.g. a plastic housing) which carries and contains the electrical components of mobile station 102 including battery 138. Mobile station 102 operates using a Subscriber Identity Module (SIM) 140 which is connected to or inserted in mobile station 102 at a SIM interface 142. SIM 140 is one type of a conventional "smart card" used to identify an end user (or subscriber) of mobile station 102 and to personalize the device, among other things. Without SIM 140, the mobile station terminal, is not fully operational for communication through wireless network 104. By inserting SIM 140 into mobile station 102, an end user can have access to any and all of his/her subscribed services. SIM 140 generally includes a processor and memory for storing information. Since SIM 140 is coupled to SIM interface 142, it is coupled to controller 106 through communication lines 144. In order to identify the subscriber, SIM 140 contains some user parameters such as an International Mobile Subscriber Identity (IMSI). An advantage of using SIM 140 is that end users are not necessarily bound by any single physical mobile station. SIM 140 may store additional user information for the mobile station as well, including datebook (or calendar) information and recent call Information.

Mobile station 102 may consist of a single unit, such as a data communication device, a cellular telephone, a multiple-function communication device with data and voice communication capabilities, a personal digital assistant (PDA) enabled for wireless communication, or a computer incorporating an internal modem. Preferably, as mentioned earlier, mobile station 102 is a handheld portable communication device which includes a housing (e.g. a plastic housing) which carries and contains the electrical components of mobile station 102. Alternatively, mobile station 102 may be a multiple-module unit comprising a plurality of separate components, including but in no way limited to a computer or other device connected to a wireless modem. In particular, for example, in the mobile station block diagram of FIG. 1, RF transceiver circuitry 108 and antenna 110 may be implemented as a radio modem unit that may be inserted into a port on a laptop computer. In this case, the laptop computer would include display 112, keyboard 114, one or more auxiliary UIs 116, and controller 106 embodied as the computer's CPU. It is also contemplated that a computer or other equipment not normally capable of wireless communication may be adapted to connect to and effectively assume control of RF transceiver circuitry 108 and antenna 110 of a single-unit device such as one of those described above. Such a mobile station 102 may have a more particular implementation as described later in relation to mobile station 202 of FIG. 2.

Mobile station 102 communicates in and through wireless communication network 104. Wireless communication network 104 may be a cellular telecommunications network. In the embodiment of FIG. 1, wireless network 104 is configured in accordance with General Packet Radio Service (GPRS) and a Global Systems for Mobile (GSM) technologies. Today, such a mobile station may further operate in accordance with Enhanced Data rates for GSM Evolution (EDGE) or Enhanced GPRS (EGPRS), as described in the Background section. In such environment, wireless network 104 includes a base station controller (BSC) 120 with an associated tower station 118, a Mobile Switching Center (MSC) 122, a Home Location Register (HLR) 132, a Serving General Packet Radio Service (GPRS) Support Node (SGSN) 126, and a Gateway GPRS Support Node (GGSN) 128. MSC 122 is coupled to BSC 120 and to a landline network, such as a Public Switched Telephone Network (PSTN) 124. SGSN 126 is coupled to BSC 120 and to GGSN 128, which is in turn coupled to a public or private data network 130 (such as the Internet). HLR 132 is coupled to MSC 122, SGSN 126, and GGSN 128.

Station 118 is a fixed transceiver station, and station 118 and BSC 120 may be referred to as transceiver equipment. The transceiver equipment provides wireless network coverage for a particular coverage area commonly referred to as a "cell". The transceiver equipment transmits communication signals to and receives communication signals from mobile stations within its cell via station 118. The transceiver equipment normally performs such functions as modulation and possibly encoding and/or encryption of signals to be transmitted to the mobile station in accordance with particular, usually predetermined, communication protocols and parameters, under control of its controller. The transceiver equipment similarly demodulates and possibly decodes and decrypts, if necessary, any communication signals received from mobile station 102 within its cell. Communication protocols and parameters may vary between different networks. For example, one network may employ a different modulation scheme and operate at different frequencies than other networks.

The wireless link shown in communication system 100 of FIG. 1 represents one or more different channels, typically different radio frequency (RF) channels, and associated protocols used between wireless network 104 and mobile station 102. An RF channel is a limited resource that must be conserved, typically due to limits in overall bandwidth and a limited battery power of mobile station 102. Those skilled in art will appreciate that a wireless network in actual practice may include hundreds of cells, each served by a station 118 (i.e. or station sector), depending upon desired overall expanse of network coverage. All pertinent components may be connected by multiple switches and routers (not shown), controlled by multiple network controllers.

For all mobile station's 102 registered with a network operator, permanent data (such as mobile station 102 user's profile) as well as temporary data (such as mobile station's 102 current location) are stored in HLR 132. In case of a voice call to mobile station 102, HLR 132 is queried to determine the current location of mobile station 102. A Visitor Location Register (VLR) of MSC 122 is responsible for a group of location areas and stores the data of those mobile stations that are currently in its area of responsibility. This includes parts of the permanent mobile station data that have been transmitted from HLR 132 to the VLR for faster access. However, the VLR of MSC 122 may also assign and store local data, such as temporary identifications. Optionally, the VLR of MSC 122 can be enhanced for more efficient co-ordination of GPRS and non-GPRS services and functionality (e.g. paging for circuit-switched calls which can be performed more efficiently via SGSN 126, and combined GPRS and non-GPRS location updates).

Serving GPRS Support Node (SGSN) 126 is at the same hierarchical level as MSC 122 and keeps track of the individual locations of mobile stations. SGSN 126 also performs security functions and access control. Gateway GPRS Support Node (GGSN) 128 provides interworking with external packet-switched networks and is connected with SGSNs (such as SGSN 126) via an IP-based GPRS backbone network. SGSN 126 performs authentication and cipher setting procedures based on algorithms, keys, and criteria (e.g. as in existing GSM). In conventional operation, cell selection may be performed autonomously by mobile station 102 or by the transceiver equipment instructing mobile station 102 to select a particular cell. Mobile station 102 informs wireless network 104 when it reselects another cell or group of cells, known as a routing area.

In order to access GPRS services, mobile station 102 first makes its presence known to wireless network 104 by performing what is known as a GPRS "attach". This operation establishes a logical link between mobile station 102 and SGSN 126 and makes mobile station 102 available to receive, for example, pages via SGSN, notifications of incoming GPRS data, or SMS messages over GPRS. In order to send and receive GPRS data, mobile station 102 assists in activating the packet data address that it wants to use. This operation makes mobile station 102 known to GGSN 128; interworking with external data networks can thereafter commence. User data may be transferred transparently between mobile station 102 and the external data networks using, for example, encapsulation and tunneling. Data packets are equipped with GPRS-specific protocol information and transferred between mobile station 102 and GGSN 128.

Figure 2:
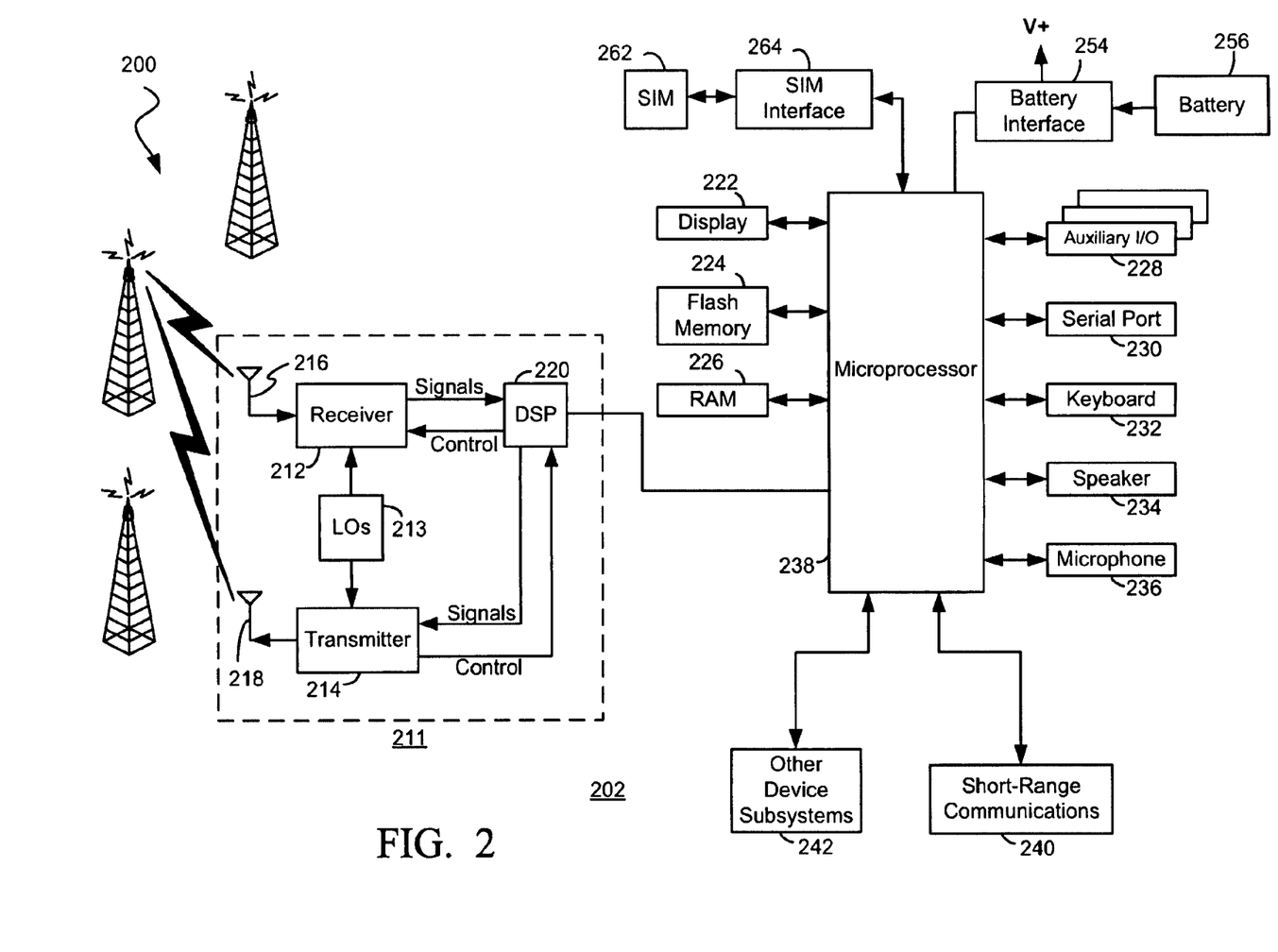
FIG. 2 is a more detailed diagram of a preferred mobile communication device of FIG. 1.

FIG. 2 is a detailed block diagram of a preferred mobile station 202 of the present disclosure. Mobile station 202 is preferably a two-way communication device having at least voice and advanced data communication capabilities, including the capability to communicate with other computer systems. Depending on the functionality provided by mobile station 202, it may be referred to as a data messaging device, a two-way pager, a cellular telephone with data messaging capabilities, a wireless Internet appliance, or a data communication device (with or without telephony capabilities). Mobile station 202 may communicate with any one of a plurality of fixed transceiver stations 200 within its geographic coverage area.

Mobile station 202 will normally incorporate a communication subsystem 211, which includes a receiver 212, a transmitter 214, and associated components, such as one or more (preferably embedded or internal) antenna elements 216 and 218, local oscillators (LOs) 213, and a processing module such as a digital signal processor (DSP) 220. Communication subsystem 211 is analogous to RF transceiver circuitry 108 and antenna 110 shown in FIG. 1. As will be apparent to those skilled in field of communications, particular design of communication subsystem 211 depends on the communication network in which mobile station 202 is intended to operate.

Mobile station 202 may send and receive communication signals over the network after required network registration or activation procedures have been completed. Signals received by antenna 216 through the network are input to receiver 212, which may perform such common receiver functions as signal amplification, frequency down conversion, filtering, channel selection, and like, and in example shown in FIG. 2, analog-to-digital (A/D) conversion. A/D conversion of a received signal allows more complex communication functions such as demodulation and decoding to be performed in DSP 220. In a similar manner, signals to be transmitted are processed, including modulation and encoding, for example, by DSP 220. These DSP-processed signals are input to transmitter 214 for digital-to-analog (D/A) conversion, frequency up conversion, filtering, amplification and transmission over communication network via antenna 218. DSP 220 not only processes communication signals, but also provides for receiver and transmitter control. For example, the gains applied to communication signals in receiver 212 and transmitter 214 may be adaptively controlled through automatic gain control algorithms implemented in DSP 220.

Network access is associated with a subscriber or user of mobile station 202, and therefore mobile station 202 requires a Subscriber Identity Module or "SIM" card 262 (denoted more generally as "mem" in FIG. 2) to be inserted in a SIM interface 264 in order to operate in the network. SIM 262 includes those features described in relation to FIG. 1. Mobile station 202 is a battery-powered device so it also includes a battery interface 254 for receiving one or more rechargeable batteries 256. Such a battery 256 provides electrical power to most if not all electrical circuitry in mobile station 202, and battery interface 254 provides for a mechanical and electrical connection for it. The battery interface 254 is coupled to a regulator (not shown) which provides a regulated voltage V to all of the circuitry.

Mobile station 202 includes a microprocessor 238 (which is one implementation of controller 106 of FIG. 1) which controls overall operation of mobile station 202. Communication functions, including at least data and voice communications, are performed through communication subsystem 211. The communication techniques of the present disclosure may generally be controlled by microprocessor 238 in connection with DSP 220. Microprocessor 238 also interacts with additional device subsystems such as a display 222, a flash memory 224, a random access memory (RAM) 226, auxiliary input/output (I/O) subsystems 228, a serial port 230, a keyboard 232, a speaker 234, a microphone 236, a short-range communications subsystem 240, and any other device subsystems generally designated at 242. Some of the subsystems shown in FIG. 2 perform communication-related functions, whereas other subsystems may provide "resident" or on-device functions. Notably, some subsystems, such as keyboard 232 and display 222, for example, may be used for both communication-related functions, such as entering a text message for transmission over a communication network, and device-resident functions such as a calculator or task list. Operating system software used by microprocessor 238 is preferably stored in a persistent store such as flash memory 224, which may alternatively be a read-only memory (ROM) or similar storage element (not shown). Those skilled in the art will appreciate that the operating system, specific device applications, or parts thereof, may be temporarily loaded into a volatile store such as RAM 226.

Microprocessor 238, in addition to its operating system functions, preferably enables execution of software applications on mobile station 202. A predetermined set of applications which control basic device operations, including at least data and voice communication applications, will normally be installed on mobile station 202 during its manufacture. A preferred application that may be loaded onto mobile station 202 may be a personal information manager (PIM) application having the ability to organize and manage data items relating to user such as, but not limited to, e-mail, calendar events, voice mails, appointments, and task items. Naturally, one or more memory stores are available on mobile station 202 and SIM 256 to facilitate storage of PIM data items and other information. The PIM application preferably has the ability to send and receive data items via the wireless network. In the present disclosure, PIM data items are seamlessly integrated, synchronized, and updated via the wireless network, with the mobile station user's corresponding data items stored and/or associated with a host computer system thereby creating a mirrored host computer on mobile station 202 with respect to such items. This is especially advantageous where the host computer system is the mobile station user's office computer system. Additional applications may also be loaded onto mobile station 202 through network, an auxiliary I/O subsystem 228, serial port 230, short-range communications subsystem 240, or any other suitable subsystem 242, and installed by a user in RAM 226 or preferably a non-volatile store (not shown) for execution by microprocessor 238. Such flexibility in application installation increases the functionality of mobile station 202 and may provide enhanced on-device functions, communication-related functions, or both. For example, secure communication applications may enable electronic commerce functions and other such financial transactions to be performed using mobile station 202.

In a data communication mode, a received signal such as a text message, an e-mail message, or web page download will be processed by communication subsystem 211 and input to microprocessor 238. Microprocessor 238 will preferably further process the signal for output to display 222 or alternatively to auxiliary I/O device 228. A user of mobile station 202 may also compose data items, such as e-mail messages, for example, using keyboard 232 in conjunction with display 222 and possibly auxiliary I/O device 228. Keyboard 232 is preferably a complete alphanumeric keyboard and/or telephone-type keypad. These composed items may be transmitted over a communication network through communication subsystem 211. For voice communications, the overall operation of mobile station 202 is substantially similar, except that the received signals would be output to speaker 234 and signals for transmission would be generated by microphone 236. Alternative voice or audio I/O subsystems, such as a voice message recording subsystem, may also be implemented on mobile station 202. Although voice or audio signal output is preferably accomplished primarily through speaker 234, display 222 may also be used to provide an indication of the identity of a calling party, duration of a voice call, or other voice call related information, as some examples.

Serial port 230 in FIG. 2 is normally implemented in a personal digital assistant (PDA)-type communication device for which synchronization with a user's desktop computer is a desirable, albeit optional, component. Serial port 230 enables a user to set preferences through an external device or software application and extends the capabilities of mobile station 202 by providing for information or software downloads to mobile station 202 other than through a wireless communication network. The alternate download path may, for example, be used to load an encryption key onto mobile station 202 through a direct and thus reliable and trusted connection to thereby provide secure device communication. Short-range communications subsystem 240 of FIG. 2 is an additional optional component which provides for communication between mobile station 202 and different systems or devices, which need not necessarily be similar devices.

Figure 3:
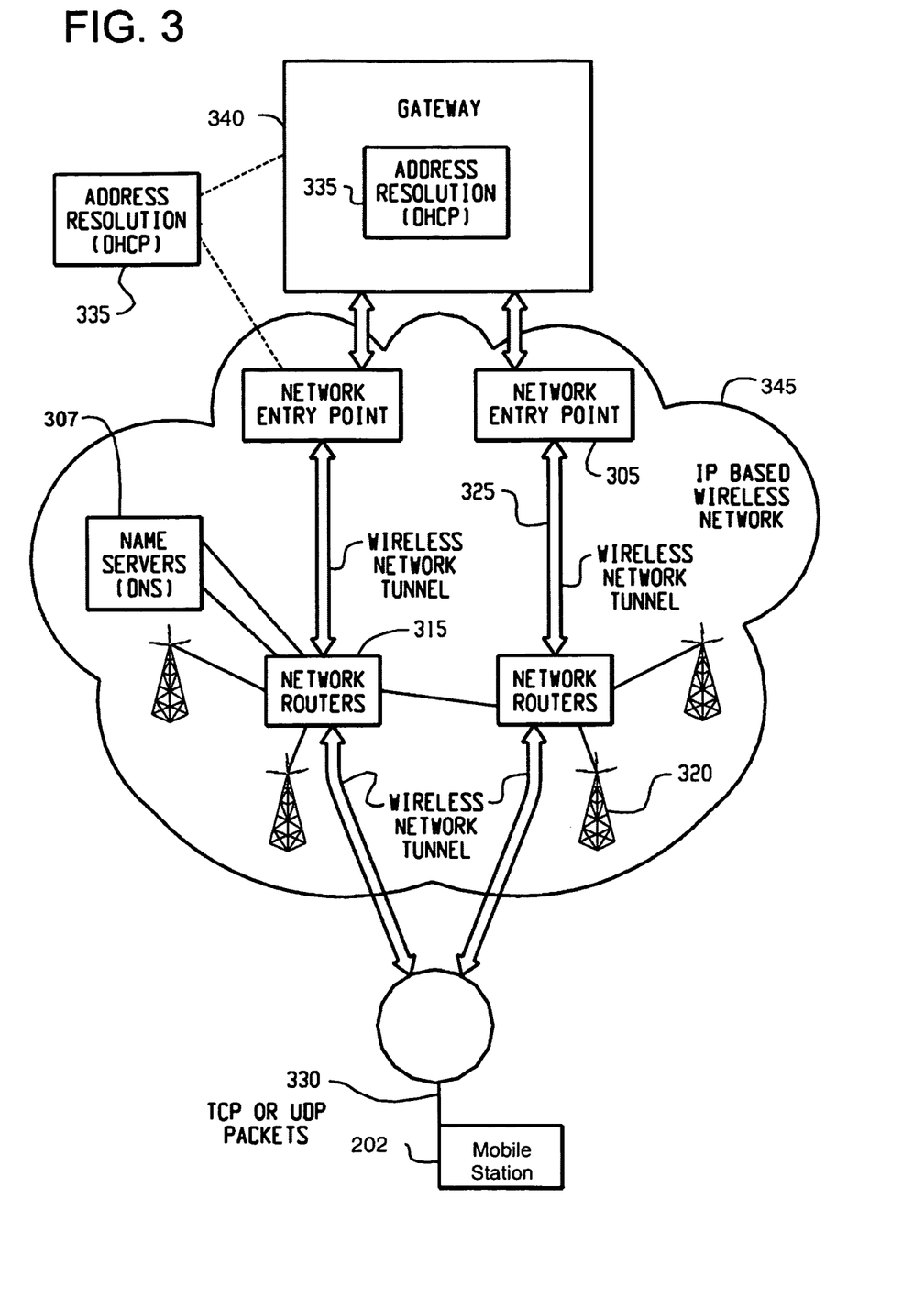
FIG. 3 is a particular system architecture for the mobile communication device and wireless network of FIGS. 1 and 2.

FIG. 3 shows a particular system structure for packet data communications with mobile station 202. In particular, FIG. 3 shows basic components of an IP-based wireless data network which may be utilized for high-speed and "pushed" data communications. Mobile station 202 communicates with a wireless packet data network 345, and may also be capable of communicating with a wireless voice network (not shown). As shown in FIG. 3, a gateway 340 may be coupled to an internal or external address resolution component 335 and one or more network entry points 305. Data packets are transmitted from gateway 340, which is source of information to be transmitted to mobile station 202, through network 345 by setting up a wireless network tunnel 325 from gateway 340 to mobile station 202. In order to create this wireless tunnel 325, a unique network address is associated with mobile station 202. In an IP-based wireless network, however, network addresses are typically not permanently assigned to a particular mobile station 202 but instead are dynamically allocated on an as-needed basis. It is thus preferable for mobile station 202 to acquire a network address and for gateway 340 to determine this address so as to establish wireless tunnel 325.

Network entry point 305 is generally used to multiplex and demultiplex amongst many gateways, corporate servers, and bulk connections such as the Internet, for example. There are normally very few of these network entry points 305, since they are also intended to centralize externally available wireless network services. Network entry points 305 often use some form of an address resolution component 335 that assists in address assignment and lookup between gateways and mobile stations. In this example, address resolution component 335 is shown as a dynamic host configuration protocol (DHCP) as one method for providing an address resolution mechanism.

A central internal component of wireless data network 345 is a network router 315. Normally, network routers 315 are proprietary to the particular network, but they could alternatively be constructed from standard commercially available hardware. The purpose of network routers 315 is to centralize thousands of fixed transceiver stations 320 normally implemented in a relatively large network into a central location for a long-haul connection back to network entry point 305. In some networks there may be multiple tiers of network routers 315 and cases where there are master and slave network routers 315, but in all such cases the functions are similar. Often network router 315 will access a name server 307, in this case shown as a dynamic name server (DNS) 307 as used in the Internet, to look up destinations for routing data messages. Fixed transceiver stations 320, as described above, provide wireless links to mobile station 202.

Wireless network tunnels such as a wireless tunnel 325 are opened across wireless network 345 in order to allocate necessary memory, routing, and address resources to deliver IP packets. Such tunnels 325 are activated as part of what are referred to as Packet Data Protocol or "PDP contexts" (i.e. packet data sessions). To open wireless tunnel 325, mobile station 100 must use a specific technique associated with wireless network 345. The step of opening such a wireless tunnel 325 may require mobile station 202 to indicate the domain, or network entry point 305 with which it wishes to open wireless tunnel 325. In this example, the tunnel first reaches network router 315 which uses name server 307 to determine which network entry point 305 matches the domain provided. Multiple wireless tunnels can be opened from one mobile station 100 for redundancy, or to access different gateways and services on the network. Once the domain name is found, the tunnel is then extended to network entry point 305 and necessary resources are allocated at each of the nodes along the way. Network entry point 305 then uses the address resolution (or DHCP 335) component to allocate an IP address for mobile station 100. When an IP address has been allocated to mobile station 202 and communicated to gateway 340, information can then be forwarded from gateway 340 to mobile station 202.

Figure 4:
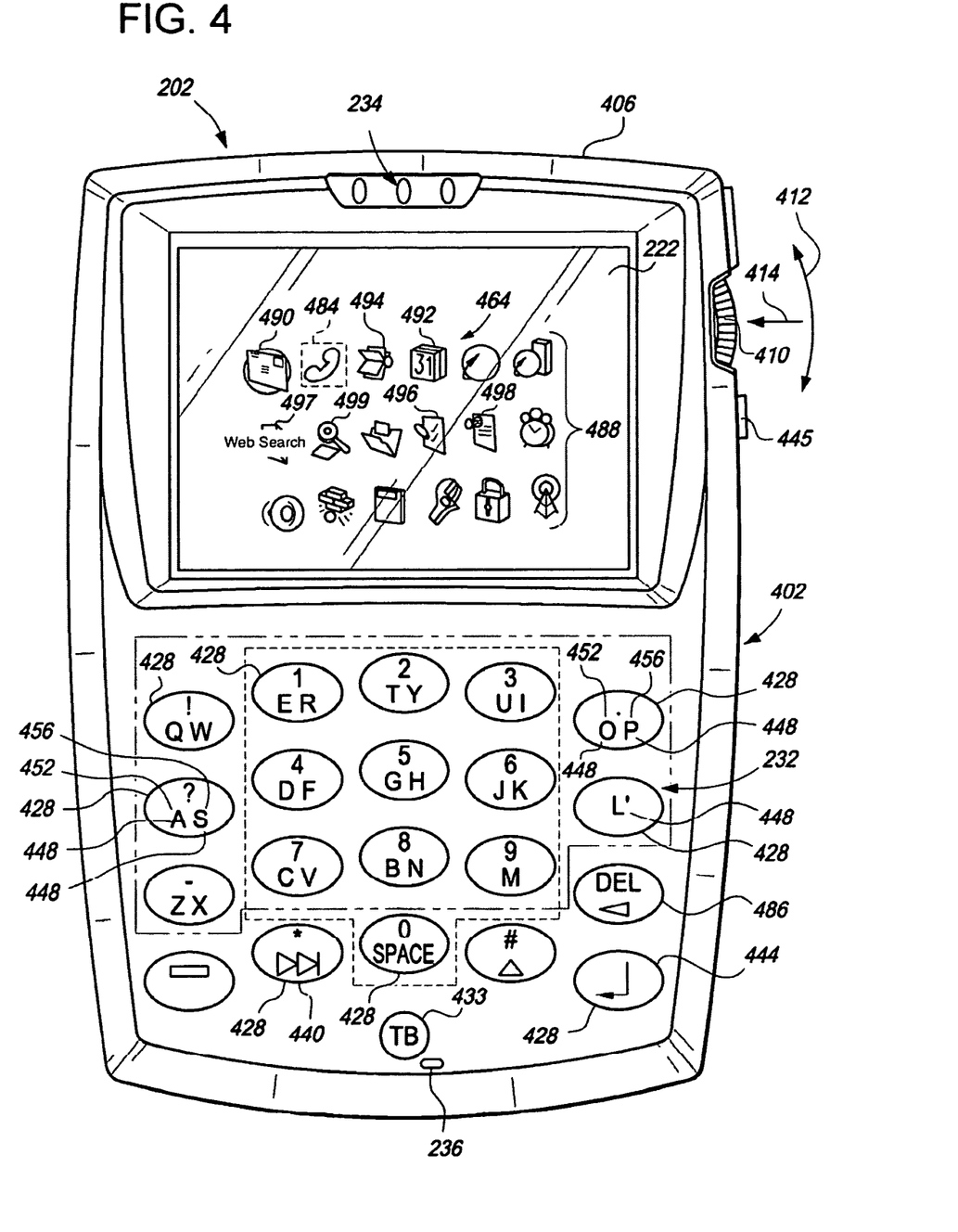
FIG. 4 is an illustrative example of an exemplary user interface of the mobile communication device of FIGS. 1 and 2, which is shown as a handheld mobile telephony and/or messaging device.

Referring now to FIG. 4, what is shown is an illustrative representation of an exemplary user interface 402 of mobile station 202 of FIGS. 1 and 2 which includes at least display 222, keyboard 232, speaker 234, microphone 236, and a cursor or view positioning mechanism such as a positioning wheel 410 (e.g. a scrollwheel) or a trackball 433. Although shown enlarged in FIG. 4 for clarity, this mobile station 202 is sized to be a handheld portable device. As an alternative to or in addition to positioning wheel 410 and/or trackball 433, a wide range of one or more pointing or cursor/view positioning mechanisms such as a touch pad a joystick button, a mouse, a touchscreen, a tablet, or other whether presently known or unknown, may be employed. The cursor may be or include a pointer, a movable item or other visual cue used to mark a position or point to another item on a display, in order to, for example, indicate position for data entry or for selection of the other item.

Keys 428 of keyboard 232 are disposed on a front face of a housing 406 and positioning wheel 410 is disposed at a side of housing 406. Keyboard 232 is in the example form of a reduced QWERTY keyboard including a plurality of keys 428 that serve as input members. It can be seen that the arrangement of the characters 448 on keys 428 of keyboard 424 is generally of the QWERTY arrangement, albeit with many of keys 428 including two of characters 448. In the example depiction of keyboard 424, many of keys 428 include two characters, such as including a first character 452 and a second character 456 assigned thereto. Characters may include letters, digits, symbols and the like and can additionally include ideographic characters, components thereof, and the like. One of keys 428 of keyboard 424 includes as the characters 448 thereof the letters "Q" and "W", and an adjacent key 428 includes as the characters 448 thereof the letters "E" and "R". Keyboard 424 may be of other configurations, such as an AZERTY keyboard, a QWERTZ keyboard, a Dvorak keyboard, or other keyboard or keypad arrangement, and either reduced or not reduced (i.e. full). In a "full" or non-reduced keyboard or keypad arrangement, each key has a single letter (not multiple letters) of the alphabet assigned to it.

Among keys 428 of keyboard 232 are a <NEXT> key 440 and an <ENTER> key 444. The <NEXT> key 440, wherein, for example, "<NEXT>" may be a symbol or may be the word "next" provided (e.g. printed) on the key, may be pressed to provide a selection input to the processor and provides substantially the same selection input as is provided by a rotational input of positioning wheel 410. Since <NEXT> key 440 is provided adjacent a number of other keys 428 of keyboard 232, the user can provide a selection input to the processor substantially without moving the user's hands away from the keyboard 232 during a text entry operation. Another key, the <ESC> key 445 is disposed on the side of housing 406 adjacent positioning wheel 438, although the same or similar key may be disposed as part of keyboard 232. Among keys 428 of the keyboard 424 additionally is a <DEL> key 486 that can be provided to delete a text entry.

Positioning wheel 410 may serve as another input member and is both rotatable, as is indicated by an arrow 412, to provide selection inputs to the processor, and also can be pressed in a direction generally toward housing 406, as is indicated by an arrow 414 to provide another selection input to the processor.

Display 222 may include a cursor 484 that depicts generally where the next input or selection from user interface 402 will be received. Display 222 is shown in FIG. 4 as displaying a home screen that represents a number of applications 586 (FIG. 3 shows some of the example possible applications 86) depicted as corresponding discrete icons 488. Icons 488 include, for example, an Electronic Mail (E-Mail) icon 490, a Calendar icon 492, an Address Book icon 494, a Tasks icon 496, a Web browser/search icon 497, a MemoPad icon 498, and a Local Device Search icon 499, respectively.

Figure 5:
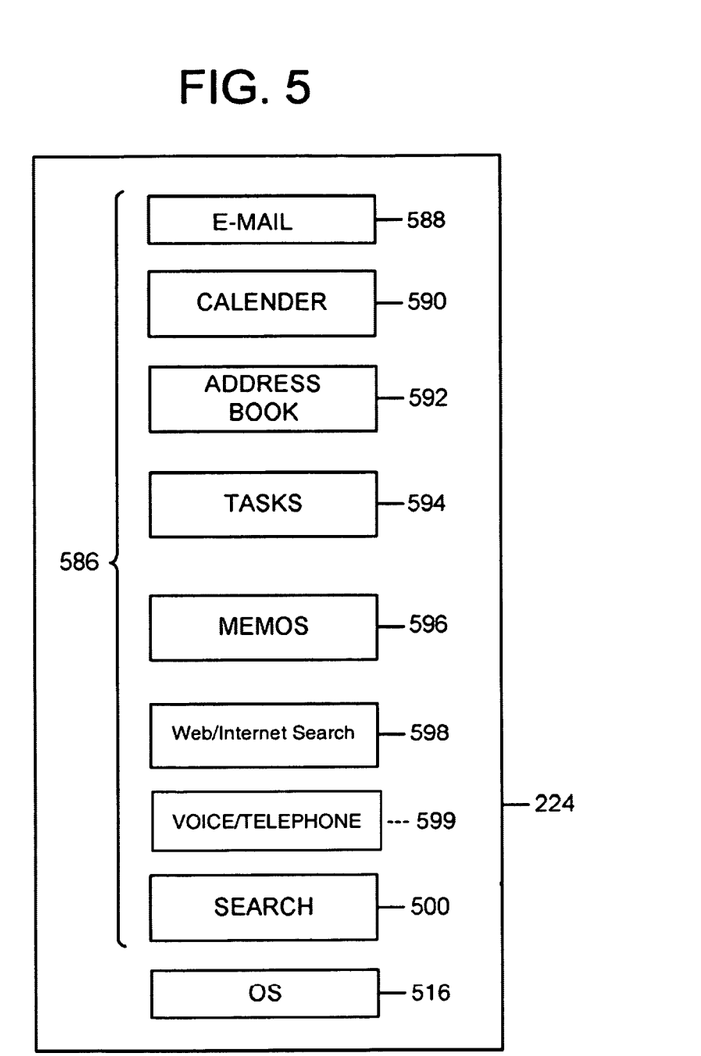
FIG. 5 is an illustrative representation of memory of the mobile communication device which has a plurality of applications stored therein, including a Web browser or search application.

As shown further in FIG. 5, memory 224 of mobile station 202 includes a plurality of applications or routines 586 associated with the visually displayed icons 488 of FIG. 4 for the processing of data. Applications 586 may be in any of a variety of forms such as, without limitation, software, firmware, and the like. Applications 586 include, for example, an Electronic Mail (E-Mail) application 588 (FIG. 5) associated with E-mail icon 490 (FIG. 4), a Calendar application 590 (FIG. 5) associated with Calendar icon 492 (FIG. 4), an Address Book application 592 (FIG. 5) associated with Address Book icon 494 (FIG. 4), a Tasks application 594 (FIG. 5) associated with Tasks icon 496 (FIG. 4), a MemoPad (Memos) application 596 (FIG. 5) associated with MemoPad icon 498, a Web Browser or search application 598 (FIG. 5) associated with Web Browser/Search icon 497 (FIG. 4), a Voice/Telephone application 599 (FIG. 5) associated with Voice/Telephone icon 484, and a Local Device Search application 500 (FIG. 5) associated with Local Device Search icon 499 (FIG. 4). An operating system (OS) program 516 also resides in memory 224.

In FIG. 4, the "home" screen output is shown as currently active and constitutes the main "ribbon" application for displaying the icons 488 shown. An application, such as E-mail application 588 of FIG. 5, may then be initiated (opened or viewed) from user interface 402 by providing a suitable user input to it. For example, E-mail application 588 may be initiated (opened or viewed) by rotating positioning wheel 410 to highlight E-mail icon 490 and providing a selection input by translating positioning wheel 410 in the direction indicated by arrow 438. As another example, display 222 displays icon 499 associated with Search application 500 and accepts input from positioning wheel 410 to initiate a search from that icon 499. Applications 586 may be additionally or alternatively initiated (opened or viewed) from user interface 402 by providing another suitable input to it, such as by suitably rotating or "rolling" trackball 433 and providing a selection input by, for example, pushing the trackball 433 (e.g. somewhat similar to positioning wheel 410 except into the plane of FIG. 4).

Movement, navigation, and/or scrolling with use of a cursor/view positioning mechanism is beneficial given the relatively large size of visually displayed information and the compact size of display 222 of FIG. 4, and since information and messages are typically only partially presented in the limited view of display 222 at any given moment. As previously described, positioning wheel 410 is one helpful cursor/view positioning mechanism to achieve such movement. Positioning wheel 410, which may be referred to as a scrollwheel, specifically includes a circular disc which is rotatable about a fixed axis of housing 302 and may be rotated by the end user's index finger or thumb. When the information or message is being partially displayed, an upwards rotation of positioning wheel 410 causes an upwards scrolling such that display 222 presents viewing of an upper portion of the information or message. Similarly, a downwards rotation of positioning wheel 410 causes a downwards scrolling such that display 222 presents viewing of a lower portion of the information or message. Positioning wheel 410 is mounted along a fixed linear axis such that the end user can depress positioning wheel 410 inwards toward housing 406 (e.g. with the end user's index finger or thumb) for selection of information. Again, see the direction indicated by an arrow 414 of positioning wheel 410 shown.

Although a specific mobile station 202 has just been described, any suitable mobile communication device or terminal may be part of the inventive methods and apparatus which will be described in fuller detail below. Note that many components of mobile device 202 shown and described may not be included (e.g. a full QWERTY keypad may be optional).

Figure 6:
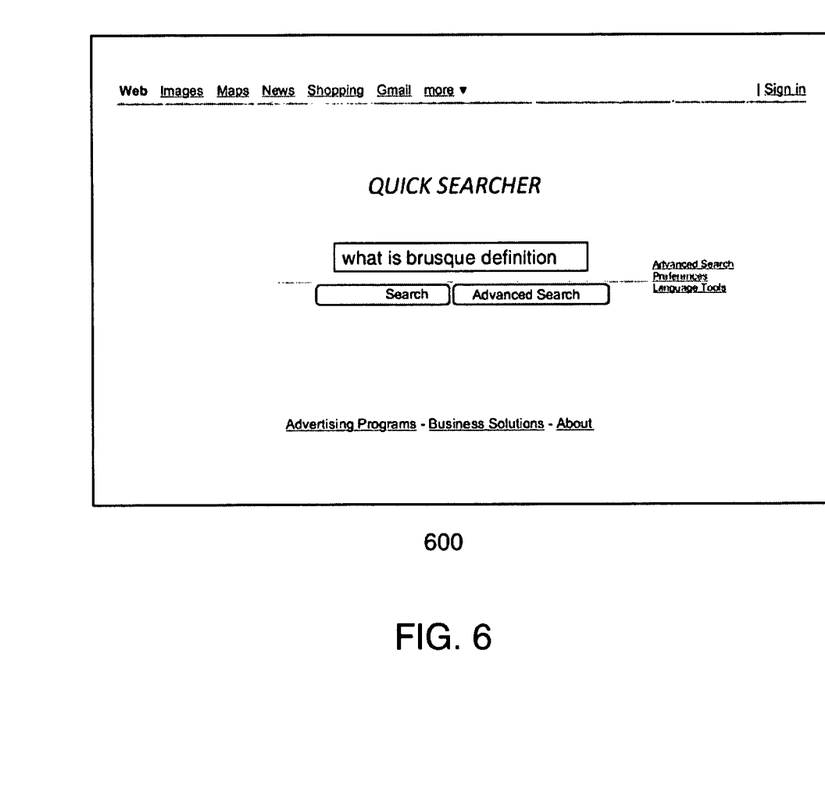
FIG. 6 is an illustration of a web page of a network search engine which is displayed via the Web browser or search application.

FIG. 6 is an illustration of a web page 600 of a network search engine which is displayed via the Web browser or search application in the display of the mobile station when it operates in the wireless network. The search engine is provided at one or more servers which are accessible via another communication network (e.g. the Internet). In this example, the search engine is called "Quick Searcher" which generally may be accessed at a domain name of www.quick-searcher.com. A Uniform Resource Locator (URL) associated with the domain name is http://www.quicksearcher.com, which may be submitted as part of a request by the user in a URL field of the Web browser or search application or, alternatively, automatically submitted by the application when the user initiates the application (e.g. in a predefined destination field).

Figure 7:
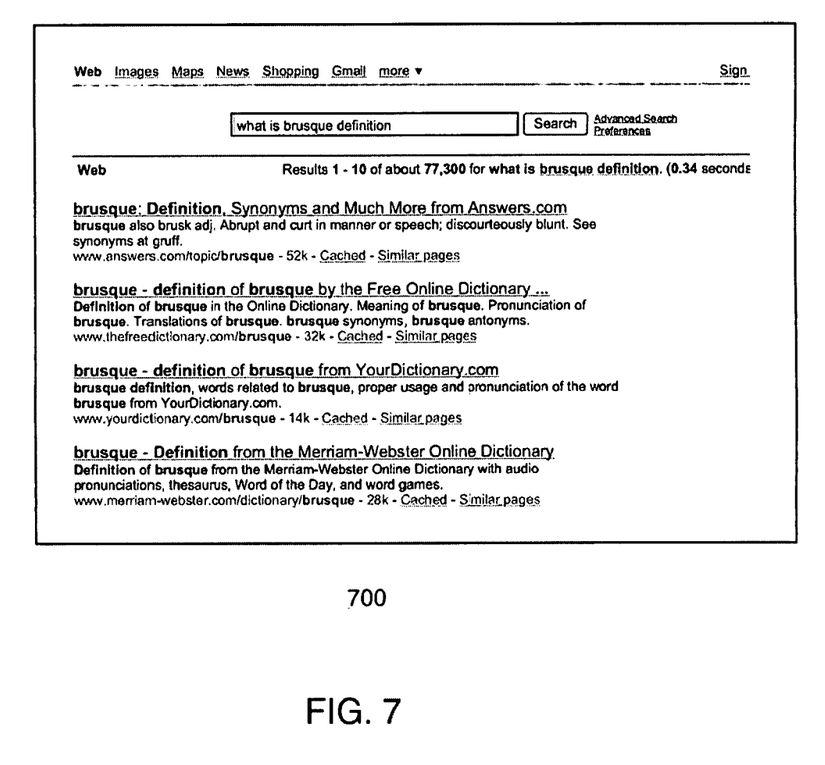
FIG. 7 is an illustration of a web page of the network search engine which shows search results in response to a search query.

In FIG. 6, a search query is shown in a search query field of web page 600. In this example, the search query is shown in the search query field as "what is brusque definition," where the user of the mobile station desires to obtain the definition of the word "brusque." Note that operators such as Boolean operators (e.g. AND, OR) may be implicitly present in this search query; in the present example, the implicit Boolean operator may include an "AND" operator between words. The Boolean operators may alternatively be explicitly present in the search query. In FIG. 7, an illustration of a web page 700 of the network search engine with search results provided in response to the search query of FIG. 6 is shown. Preferably, the search engine utilized is a GOOGLE™ search engine where the search queries are formatted in accordance with GOOGLE™ search queries. GOOGLE™ is a trademark of Google Inc. of Mountain View, Calif., U.S.A.

As described, with use of the Web browser or search application, the user of the mobile station may enter in the domain name of the URL in a request to access a web page of the server. If the server is or has a search engine, the user may also submit search (e.g. text) parameters in a request to initiate a search for information via the search engine based on the search parameters. Depending on the (world-wide) location of the mobile station, however, an unexpected web site, search results, and/or information may be received in response to such request.

Figure 8:
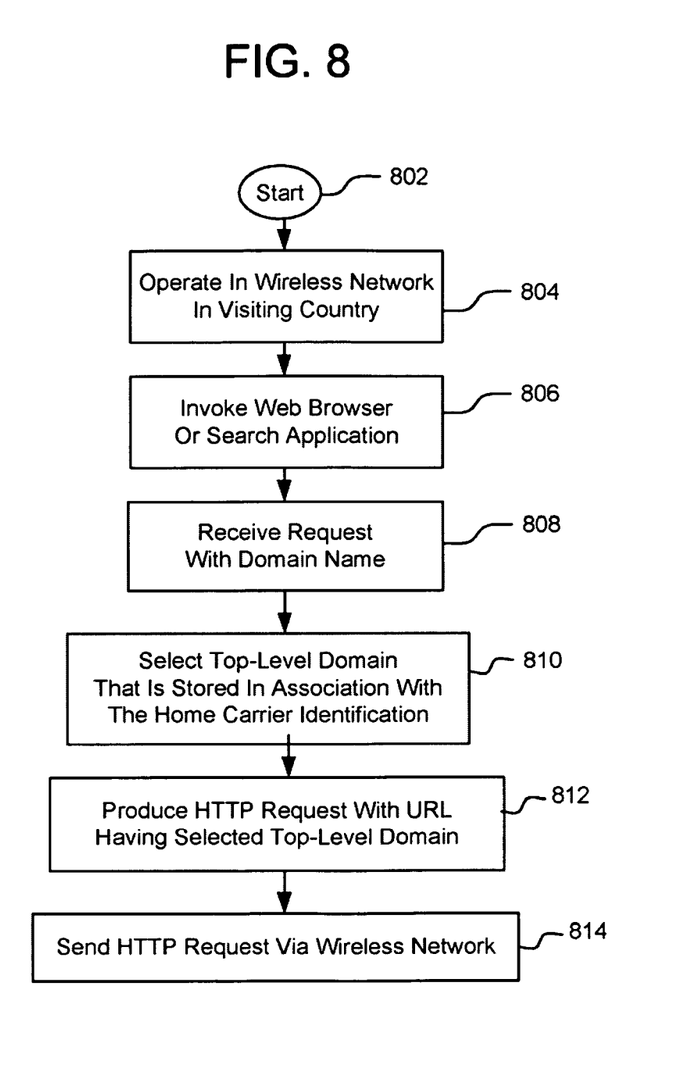
FIG. 8 is a flowchart of a method for use in producing and submitting a Hypertext Transfer Protocol (HTTP) request from the mobile device.

FIG. 8 is a flowchart of a method for use in producing and submitting a Hypertext Transfer Protocol (HTTP) request from the mobile device. Such technique may overcome prior art deficiencies and other related deficiencies in these and other environments. This method is especially useful when the mobile station operates in different wireless networks (e.g. "visited networks" when roaming) provided in different countries (e.g. "visited countries"). The method of FIG. 6 may be performed by mobile station 102/202 described in relation to FIGS. 1-4. In particular, the techniques described in relation to the flowchart may be performed by one or more processors of mobile station 202 along with its wireless transceiver. A computer program product which may embody the technique may include a computer readable medium having computer instructions stored therein which are executable by the one or more processors of the mobile station 202 for performing the technique.

Before discussion of the steps in the flowchart of FIG. 8, note that the mobile station is associated with a home wireless carrier which is identifiable by a home carrier identification stored in its memory. The home carrier identification uniquely identifies the home wireless carrier which provides primary service for the mobile station. The home carrier identification is associated with a home country within which the primary service is based and/or provided for the mobile station. Some examples of names of wireless carriers are Rogers Wireless, T-Mobile, Verizon Wireless, Orange, Telecom Italia, Virgin Mobile UK, Swisscom, etc. The home carrier identification remains fixed and unchanged during operation of the mobile station, regardless of the network or country in which the mobile station is operating. The home carrier identification may be a specific stored designation which indicates the wireless carrier by name or by code. For example, the home carrier identification may be a numeric code, which may be and/or be referred to as a vendor identification. As another example, the home carrier identification may be the actual name of the carrier. As yet another example, in the case where the network is a public land mobile network (PLMN) (i.e. the home PLMN or "HPLMN"), the home carrier identification may be and/or correspond to a Mobile Network Code (MNC) and a Mobile Country Code (MCC) pairing. Alternatively, the home carrier identification may be a system identification (SID). Finally, only a portion of the home carrier identification (such as the country code or MCC) may be of relevance in the present techniques. The home carrier identification may be stored in the Subscriber Identity Module (SIM) of the mobile station, or other suitable removable memory module thereof. In an alternate embodiment, the identification may be programmed in internal memory (e.g. Flash memory or otherwise) of the mobile station, e.g. during manufacture of the mobile station. In any event, the memory in which the home carrier identification is stored may be referred to as a first memory portion of the mobile station.

Note also that the mobile station maintains a list of a plurality of carrier identifications in its memory, where each carrier identification is stored in association with a different one of a plurality of top-level domains. The list of carrier identifications having the associated top-level domains is programmed or maintained to be the same in all mobile stations (i.e. in a plurality of mobile station) distributed for use worldwide (i.e. in a plurality of different countries), at least those mobile stations of the same model and/or version. In contrast, the home carrier identifications for these mobile stations are programmed or maintained to be different across different wireless carriers and/or different countries. The top-level domains associated with the carrier identifications may be country code top-level domains (ccTLDs). Some examples of TLDs which include ccTLDs are "com"/"us" for USA, "ca" for Canada, "it" for Italy, "uk"/"gb" for UK/Great Britain, "fr" for France, etc. The list of carrier identifications having the associated top-level domains may be programmed in internal memory (e.g. Flash memory or otherwise) of the mobile station, in a hardcoded-type fashion. In one embodiment, the stored association is programmed and maintained in the mobile station as part of the executable computer instructions. In any event, the memory in which the stored association is stored may be referred to as a second memory portion of the mobile station.

Beginning at a start block 802 of FIG. 8, the mobile station is operated for communications in a wireless communication network (step 804 of FIG. 8). The wireless network may be any one of various wireless networks available in different countries, as the mobility of mobile station may allow it to be used in more than one country. In the present scenario of step 804, the wireless communication network is a visited network of a visiting country that is different from the home country of the home wireless carrier. The wireless network operations may be the same as or similar to those operations described in relation to FIGS. 1-3.

At some point in time, the user invokes the Web browser or search application of the mobile station (step 806 of FIG. 8). A domain name of the desired Web site or application server is then read (step 808 of FIG. 8). The domain name may be provided in an initial request via the application or otherwise. In one example, the user may provide a URL in a URL field of the Web browser or search application. In another example, a predefined destination field associated with a stored predetermined URL or domain name may be provided for use upon invocation.

Next, using the stored list in its memory, the mobile station selects one of the plurality of top-level domains (TLDs) that is stored in association with the home carrier identification (step 810 of FIG. 8). Note that this step of selecting the TLD in step 810 may alternatively be performed prior to the invocation or request in steps 806 and 808, only a single time, where the resulting selected TLD is stored in memory for use in all subsequent steps. Note that, if no suitable TLD is found in relation to the carrier identification, a default TLD may be selected (e.g. the default TLD may be "com"). Note also that a default TLD (e.g. "com") may be associated with and selected for carriers that are known to be associated with two or more different countries.

Next, the mobile station produces a Hypertext Transfer Protocol (HTTP) request with a Uniform Resource Locator (URL) having the selected TLD from step 810 and a second-level domain of the specified domain name of the request from step 808 (step 812 of FIG. 8). For example, the second-level domain may be "quicksearcher" if the specified domain name from step 808 is www.quicksearcher.com), and the selected TLD may be "ca" (if the wireless carrier is Rogers Wireless in Canada), which results in the production of the URL of http://www.quicksearcher.ca. The mobile station causes the HTTP request with this URL to be transmitted via the wireless network (step 814 of FIG. 8). In response, the mobile station receives an HTTP response from the application server. If the search application is being utilized, the HTTP request may include a search query, where the HTTP response includes search results that are relevant to the home country instead of the visiting country. The flowchart of FIG. 8 is shown to end with this step, but is actually repeated for each invocation (step 806) or request (step 808). Thus, consistency of retrieved information or search results may be achieved regardless of which country the mobile station is operating.

In an alternate embodiment, the mobile station (or its Web browser or search application) has a first setting for a first mode of operation and a second setting for a second mode of operation. The first and the second settings may be user-selectable settings which may be set by the end user via the user interface of the mobile station. The first setting invokes the first mode of operation, which was described earlier above in relation to FIG. 8. With the second setting which invokes the second mode of operation, the mobile station does not utilize a single TLD associated with a single home wireless carrier of the mobile station. Instead, the mobile station selects one of the plurality of stored TLDs that is stored in association with the received carrier identification of its currently serving network (e.g. even if it is a visited network in a visited country). When operating outside of its home network in the visited network, the mobile station roams and scans to identify the different wireless networks available in its coverage area, receives carrier identifications (e.g. MNC/MCC pairs) of these wireless networks, and selects and registers with one of the networks for communications. The received carrier identification of this currently serving roaming network may be utilized to select the appropriate top-level domain.

As described herein, a mobile communication device is associated with a home wireless carrier that is identifiable by a home carrier identification stored in its memory. The mobile device also maintains a stored list of a plurality of carrier identifications, where each carrier identification is stored in association with one of a plurality of top-level domains. The mobile device reads the home carrier identification from the memory, and selects one of the plurality of top-level domains that is stored in association with the home carrier identification. During operation, the mobile device reads a specified domain name in response to a user-initiated request made via a Web browser or search application. Then, the mobile device produces a Hypertext Transfer Protocol (HTTP) request with a Uniform Resource Locator (URL) having the selected top-level domain and a second-level domain corresponding to the specified domain name. The HTTP request with the URL is submitted via the wireless communication network. Advantageously, consistency in accessing web sites, information, and/or search results may be achieved regardless of location of the mobile station.

The above-described embodiments of the present disclosure are intended to be examples only. Those of skill in the art may effect alterations, modifications and variations to the particular embodiments without departing from the scope of the application. The invention described herein in the recited claims intends to cover and embrace all suitable changes in technology.

What is claimed is:

1. A method for use in a processor of a mobile communication device, the method comprising:

storing, in a first memory portion of the mobile communication device, a home carrier identification which identifies a home wireless carrier of the mobile communication device;

storing, in a second memory portion of the mobile communication device, a list of a plurality of carrier identifications which identify a plurality of different wireless carriers, each said carrier identification being stored in association with one of a plurality of top-level domains which indicate a plurality of different countries of the different wireless carriers;

reading, by the processor and from the first memory portion, the home carrier identification which identifies the home wireless carrier of the mobile communication device;

selecting, by the processor and from the second memory portion, one of the plurality of top-level domains that is stored in association with a carrier identification that matches the home carrier identification read from the first memory portion, the selected top-level domain corresponding to a home country of the home wireless carrier of the mobile communication device;

while the mobile communication device operates for communications in a wireless communication network in a visiting country that is different from the home country:
  producing, by the processor, a Hypertext Transfer Protocol (HTTP) request which includes a Uniform Resource Locator (URL) comprising the selected top-level domain and a second-level domain corresponding to a specified domain name; and
  causing the HTTP request with the URL to be transmitted from the mobile communication device via the wireless communication network.

2. The method of claim 1, wherein the plurality of top-level domains comprise a plurality of country code top-level domains (ccTLDs).

3. The method of claim 1, wherein the plurality of carrier identifications are vendor identifications and the home carrier identification is a home vendor identification programmed in the mobile communication device.

4. The method of claim 1, wherein the specified domain name corresponds to a search engine server and the HTTP request comprises a search query, the method comprising the further act of:
  receiving, at the processor, an HTTP response which includes search results that are relevant to the home country instead of the visiting country.

5. The method of claim 1, wherein the HTTP request is produced in response to a user request made via a Web browser or search application of the mobile communication device.

6. The method of claim 1, wherein the specified domain name comprises a user-specified domain name.

7. The method of claim 1, wherein the act of selecting comprises the further act of:
  comparing, by the processor, the home carrier identification read from the first memory portion with one or more of the plurality of carrier identifications stored in the second memory portion until a match is found, if at all.

8. The method of claim 1, wherein the act of selecting comprises the further act of:
  comparing, by the processor, the home carrier identification read from the first memory portion with one or more of the plurality of carrier identifications stored in the second memory portion until a match is found, if at all; and
  if no match is found, selecting commercial organization ("com") as the top-level domain.

9. The method of claim 1, further comprising:
  repeating the acts of producing and causing for each one of a plurality of requests made while the mobile communication device operates in the wireless communication network.

10. The method of claim 1, wherein the home wireless carrier comprises a Home Public Land Mobile Network HPLMN and the home carrier identification is associated with a Mobile Network Code (MNC) and Mobile Country Code (MCC).

11. The method of claim 1, wherein the home carrier identification is stored in a Subscriber Identity Module (SIM) accessible by the mobile communication device.

12. The method of claim 1, which is performed by computer instructions stored on a computer readable medium, the computer instructions being executable by one or more processors of the mobile communication device.

13. A mobile communication device, comprising:
  one or more processors;
  a wireless transceiver coupled to the one or more processors;
  a user interface coupled to the one or more processors;
  a first memory portion for storing a home carrier identification which identifies a home wireless carrier of the mobile communication device;
  a second memory portion for storing a plurality of carrier identifications which identify a plurality of different wireless carriers, each said carrier identification being stored in association with one a plurality of top-level domains which indicate a plurality of different countries of the different wireless carriers;
  the one or more processors being configured to:
    read, from the first memory portion, the home carrier identification;
    select, from the second memory portion, one of the plurality of top-level domains that is stored in association with a carrier identification that matches the home carrier identification read from the first memory portion, the selected top-level domain corresponding to a home country of the home wireless carrier of the mobile communication device;
    while the mobile communication device operates for communications in a wireless communication network in a visiting country that is different from the home country:
      produce a Hypertext Transfer Protocol (HTTP) request which includes a Uniform Resource Locator (URL) comprising the selected top-level domain and a second-level domain corresponding to a specified domain name; and
      cause the HTTP request with the URL to be transmitted via the wireless communication network with use of the wireless transceiver.

14. The mobile communication device of claim 13, wherein the plurality of top-level domains comprise a plurality of country code top-level domains (ccTLDs).

15. The mobile communication device of claim 13, wherein the plurality of carrier identifications are vendor identifications and the home carrier identification is a home vendor identification programmed in the mobile communication device.

16. The mobile communication device of claim 13, wherein the specified domain name corresponds to a search engine server and the HTTP request comprises a search query for submission to the search engine server, the one or more processors being further configured to:
  receive, from the search engine server, an HTTP response which includes search results that are relevant to the home country instead of the visiting country.

17. The mobile communication device of claim 13, wherein the HTTP request to the specified domain name is made in response to a user request submitted via a Web browser or search application of the mobile communication device.

18. The mobile communication device of claim 13, wherein the specified domain name comprises a user-specified domain name.

19. The mobile communication device of claim 13, wherein the one or more processors are configured to select by:
  comparing the home carrier identification read from the first memory portion with one or more of the plurality of carrier identifications stored in the second memory portion until a match is found, if at all.

20. The mobile communication device of claim 13, wherein the one or more processors are configured to select by:
  comparing the home carrier identification read from the first memory portion with one or more of the plurality of carrier identifications stored in the second memory portion until a match is found, if at all; and if no match is found, selecting commercial organization ("com") as the top-level domain.

21. The mobile communication device of claim 13, wherein the one or more processors are further configured to:
repeat the producing and causing for each one of a plurality of requests made while the mobile communication device operates in the wireless communication network.

22. The mobile communication device of claim 13, wherein the home wireless carrier comprises a Home Public Land Mobile Network HPLMN and the home carrier identification comprises a Mobile Network Code (MNC) and Mobile Country Code (MCC).

23. he mobile communication device of claim 13, wherein the home carrier identification is stored in a Subscriber Identity Module (SIM) accessible by the mobile communication device.

24. A method for use in a mobile communication device, the method comprising:
storing, in a first memory portion of the mobile communication device, a home carrier identification which identifies a home wireless carrier of the mobile communication device;
storing, in a second memory portion of the mobile communication device, a list of a plurality of carrier identifications which identify a plurality of different wireless carriers, each said carrier identification being stored in association with one of a plurality of top-level domains which indicate a plurality of different countries of the different wireless carriers;
reading, from the first memory portion, the home carrier identification which identifies the home wireless carrier of the mobile communication device;
selecting, from the second memory portion, one of the plurality of top-level domains that is stored in association with a carrier identification that matches the home carrier identification read from the first memory portion, the selected top-level domain corresponding to a home country of the home wireless carrier of the mobile communication device;
while the mobile communication device operates for communications in a wireless communication network in a visiting country that is different from the home country:
producing, at the mobile communication device, a Hypertext Transfer Protocol (HTTP) request comprising a search query and including a Uniform Resource Locator (URL) comprising the selected top-level domain and a second-level domain corresponding to a specified domain name;
causing the HTTP request which includes the URL to be transmitted from the mobile communication device via the wireless communication network; and
receiving an HTTP response which includes search results corresponding to the search query, the search results being associated with the home country of the home wireless carrier.

25. The method of claim 24, wherein the act of selecting comprises the further act of:
comparing the home carrier identification read from the first memory portion with one or more of the plurality of carrier identifications stored in the second memory portion until a match is found, if at all.

26. The method of claim 24, further comprising:
receiving a user request via a search application of the mobile communication device;
producing the HTTP request in response to the user request.

27. A method for use in a processor of a mobile communication device, the method comprising:
storing, in a first memory portion of the mobile communication device, a home carrier identification which identifies a home wireless carrier of the mobile communication device;
storing, in a second memory portion of the mobile communication device, a list of a plurality of carrier identifications which identify a plurality of different wireless carriers, each said carrier identification being stored in association with one of a plurality of top-level domains which indicate a plurality of different countries of the different wireless carriers;
in a first mode of operation of the mobile communication device:
reading, from the second memory portion, the home carrier identification which identifies the home wireless carrier of the mobile communication device;
selecting, from the first memory portion, one of the plurality of top-level domains that is stored in association with a carrier identification that matches the home carrier identification read from the first memory portion, the selected top-level domain corresponding to a home country of the home wireless carrier of the mobile communication device;
in a second mode of operation of the mobile communication device:
receiving via a current serving network a carrier identification which identifies the current serving network of the mobile communication device;
selecting one of the plurality of top-level domains that corresponds to the received carrier identification of the current serving network;
while the mobile communication device operates for communications in the current serving network in a visiting country that is different from the home country:
producing, by the processor, a Hypertext Transfer Protocol (HTTP) request which includes a Uniform Resource Locator (URL) comprising the selected top-level domain and a second-level domain corresponding to a specified domain name; and
causing the HTTP request with the URL to be transmitted from the mobile communication device via the wireless communication network.

28. The method of claim 27, wherein the first mode of operation is invoked by a first selectable setting of the mobile communication device and the second mode of operation is invoked by a second selectable setting of the mobile communication device.

29. The method of claim 27, wherein the first mode of operation is invoked by a first user-selectable setting of the mobile communication device and the second mode of operation is invoked by a second user-selectable setting of the mobile communication device.

* * * * *